Jan. 7, 1964
R. G. HERB
3,117,210
APPARATUS FOR EVAPORATING MATERIALS
Filed July 13, 1959
3 Sheets-Sheet 1
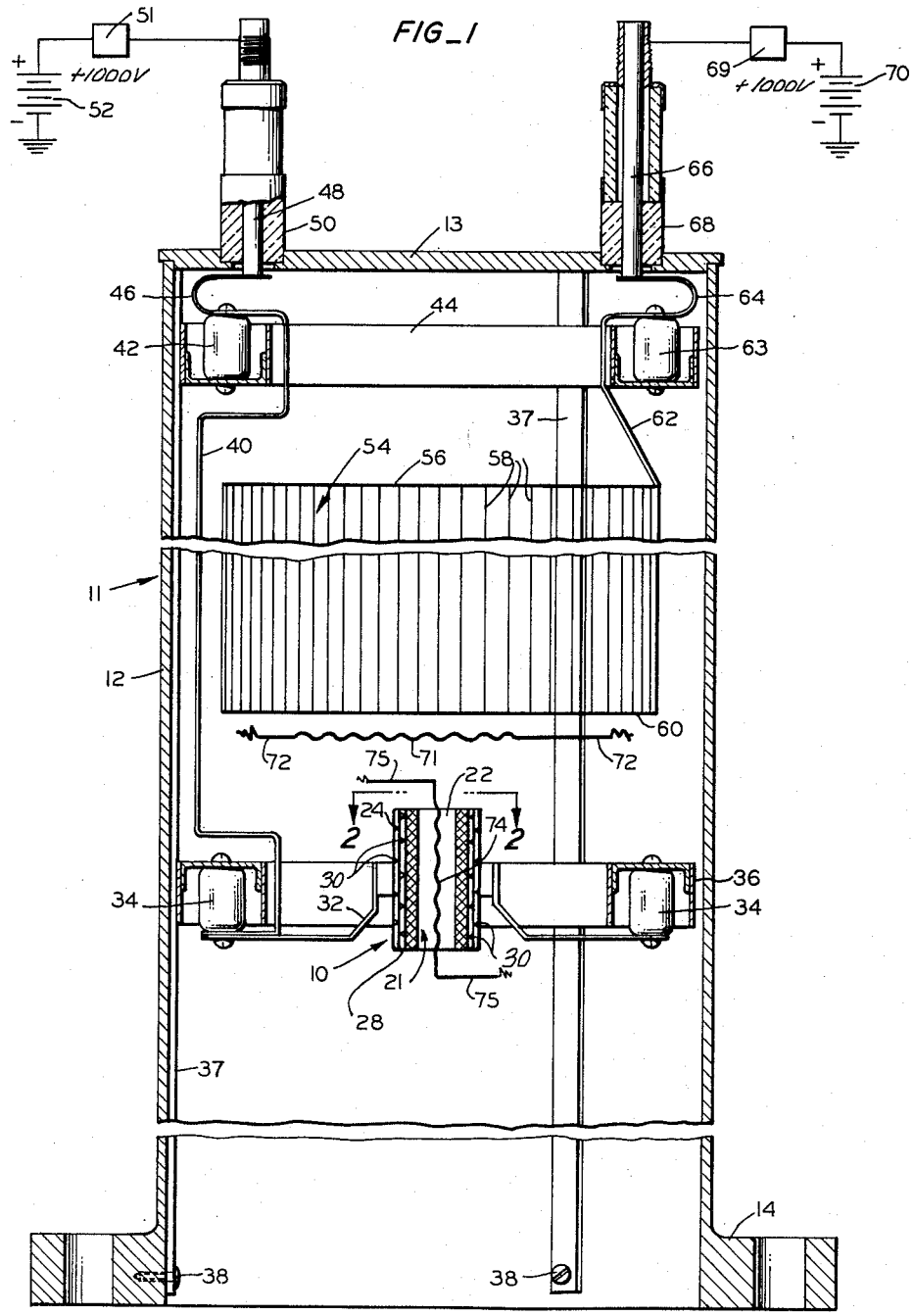
INVENTOR.
RAYMOND G. HERB
BY
Christie, Parker & Hale
ATTORNEYS Jan. 7, 1964 R. G. HERB 3,117,210
APPARATUS FOR EVAPORATING MATERIALS
Filed July 13, 1959 3 Sheets-Sheet 2
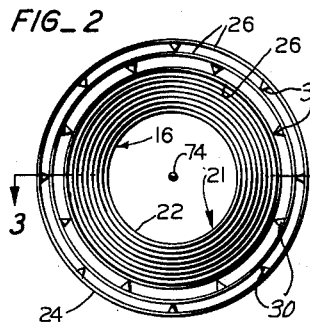
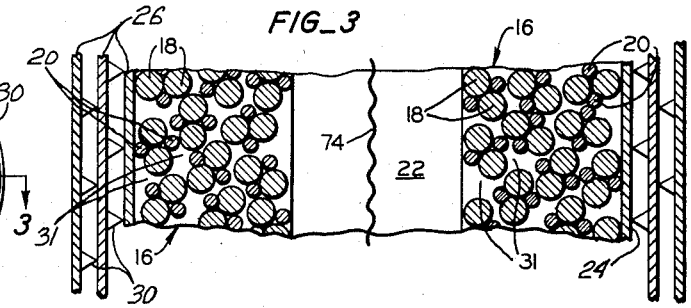
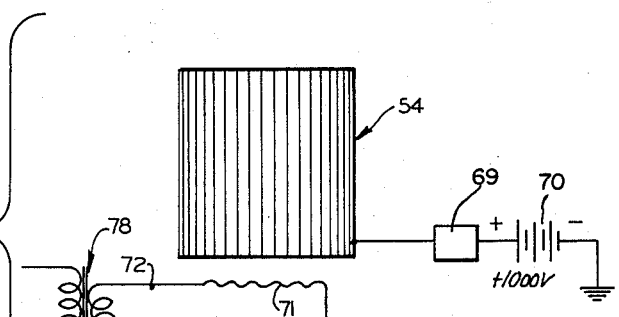
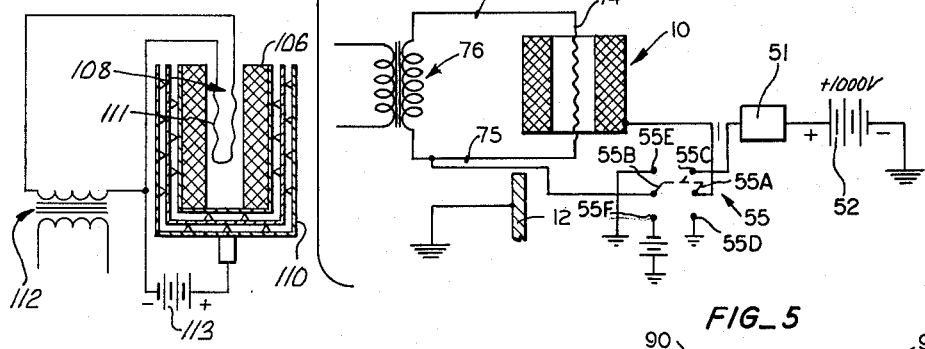
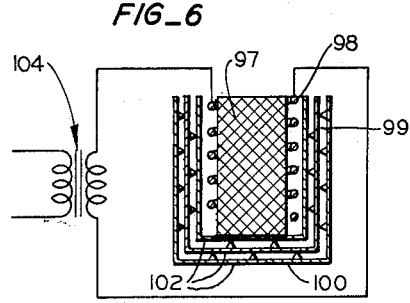
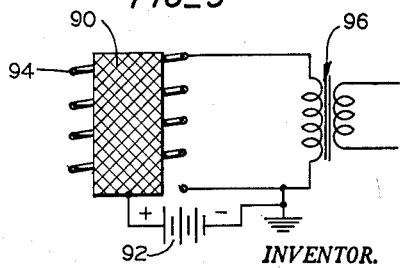
INVENTOR.
RAYMOND G. HERB
BY
Christie, Parker & Hale
ATTORNEYS INVENTOR.
RAYMOND G. HERB
BY
Christie, Parker & Hale
ATTORNEYS United States Patent Office 3,117,210
Patented Jan. 7, 1964

3,117,210
APPARATUS FOR EVAPORATING MATERIALS
Raymond G. Herb, Madison, Wis., assignor to Wisconsin Alumni Research Foundation, Madison, Wis., a corporation of Wisconsin not for profit
Filed July 13, 1959, Ser. No. 826,605
16 Claims. (Cl. 219—19)

This invention provides an improved source for evaporating materials used in coating, gettering, ionic pumping of gas, etc.

The invention is ideally suited for use in pumps of the type disclosed in my U.S. Patent No. 2,850,225, and although not so limited, is described with specific reference to such use. The patented pumps vaporize a "getter" material located in an enclosed chamber so that vaporized getter condenses on the interior surfaces of the chamber to trap gas and produce a low pressure in the chamber. The getter material is fed either continuously or intermittently in solid form from a relatively cool location to the point of vaporization, which is highly heated, say by electron bombardment.

The patented pumps do a good job in pumping gases at exceptionally high speed while maintaining a high vacuum entirely free of organic or mercury vapor without the use of any kind of trap or baffle. However, the prior pumps have the disadvantage of supplying getter material with a feeding mechanism using moving parts which tend to clog or develop other mechanical difficulties, or else the pumps are of relatively low capacity because of the limited supply of getter.

Another disadvantage of the prior pumps is the tendency for the getter to evaporate unevenly, and to give off gas continuously as it is moved into the zone of vaporization. Both of these factors reduce the efficiency of the pumps.

This invention provides an inexpensive source of vaporizable material with exceptionally long life. Moreover, the source evaporates material at an easily controlled and uniform rate without continuously giving off gas, thereby improving pumping speed and efficiency.

Briefly, the invention contemplates an evaporator comprising a supporting core having a plurality of interconnected internal channels opening out of the core surface. A material to be evaporated is disposed in the channels so that when it is heated, and vaporized, it contacts a plurality of surfaces before it diffuses from the core interior and finally escapes from the core surface.

In the presently preferred form of the invention, the evaporator is made of a stranded material in which at least one strand is composed of the material to be evaporated, at least one other strand is composed of a core material having a melting point higher than that of the material to be evaporated. The stranded material evaporator is disposed around and spaced from a thermionic filament which heats the evaporator by radiation and electron bombardment to cause the material to be evaporated to melt and flow over the core material to be evaporated to melt and flow over the core material from which it evaporates. The stranded material is arranged to provide a plurality of loops disposed side by side so that interconnected channels are formed between adjacent portions of the core material. A major portion of the material to be evaporated is originally disposed within the internal portion of the evaporator and must contact many surfaces prior to escaping. A heat shield is disposed around the evaporator for concentrating the heat produced by the thermionic filament on the stranded material.

Apparently, the more volatile material is evaporated, condensed, and re-evaporated several times before leaving the evaporator. At the same time, extraneous gas originally carried by the material is released on the initial heating and readily escapes from the material and core. Thus, the evaporator produces a thorough "outgassing" and a progressive "distillation" of the evaporated material. The evaporated material is also probably better atomized and the distribution as a function of angle is smoother and more reproducible than in prior evaporators. Since the evaporated material is more finely divided, in a purer state, and better distributed, it produces an improved surface for coating, as well as gettering and pumping.

These and other aspects of the invention will be more fully understood from the following detailed description taken in conjunction with the accompanying drawings in which:

FIG. 1 is a schematic elevation showing the use of the presently preferred embodiment of the evaporator in a vacuum pump;

FIG. 2 is a view of the evaporator taken on line 2—2 of FIG. 1;

FIG. 3 is a fragmentary cross sectional view taken on line 3—3 of FIG. 2;

FIG. 4 is a schematic circuit diagram showing how the various electrical components of the apparatus of FIG. 1 are connected;

FIG. 5 is a schematic diagram of an alternate embodiment of the evaporator;

FIG. 6 is a schematic diagram of another embodiment of the evaporator;

FIG. 7 is a schematic diagram of yet another embodiment of the evaporator;

Figure 8:
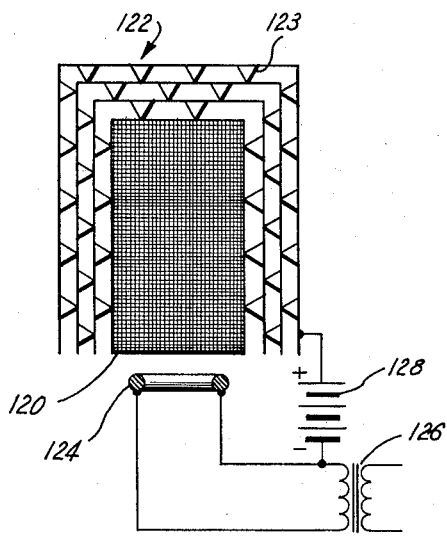
Figure 9:
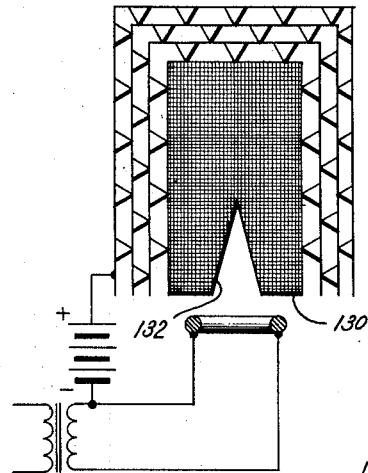
Figure 11:
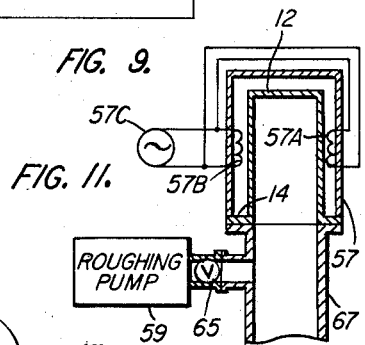
Figure 10:
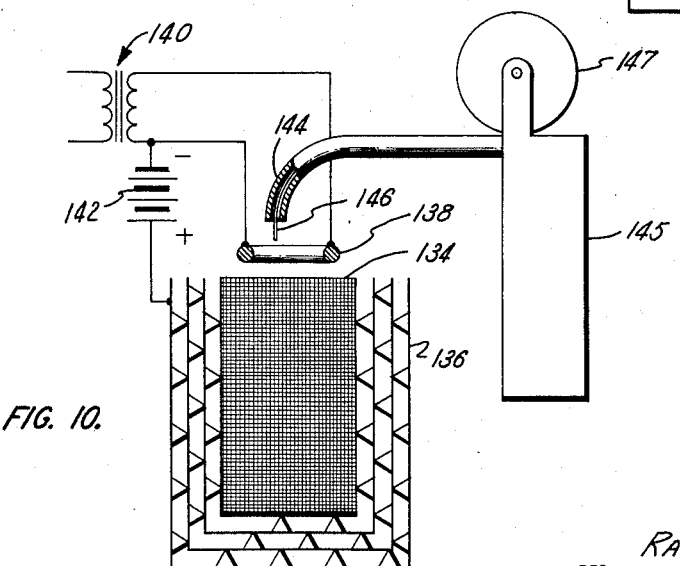

FIGS. 8, 9, and 10 are each schematic diagrams of further embodiments of the evaporator; and FIG. 11 is a schematic elevation of a furnace and roughing pump for the with the vacuum pump of FIG. 1.

Referring to FIG. 1, an evaporator 10 is mounted in the central portion of a vacuum pump 11 which includes an upright cylindrical hollow housing 12 closed at its upper end by top 13 and provided at its bottom with an outwardly extending flange 14 adapted to connect the pump housing to an auxiliary pumping system (not shown) and to a system to be evacuated (not shown).

The evaporator includes a stranded wire 16 consisting of two strands 18 (see FIG. 3) of a material to be evaporated, say titanium, twisted with two strands of a core material 20, say tantalum or tungsten. As shown in FIG. 3, the titanium strands are about twice the diameter of the tungsten strands. Good results have been obtained with stranded wire utilizing a wire of gettering material substantially larger in diameter than the core strand. The reduced surface area per unit volume of material to be evaporated appeared to improve pumping performance in requiring less degassing of the evaporable material. Although not entirely critical, diameters of .020" and .010" for the titanium and tungsten, respectively have proved very satisfactory.

The stranded wire is tightly wound to form a cylinder or cartridge 21 which has a central opening 22 through it, and which fits snugly inside a heat shield cup 24 made up of three concentric sleeves 26 crimped inwardly at 28 at their bottoms. The outer and intermediate sleeves each have inwardly extending projections 30 so that the intermediate sleeve is spaced from the inner and outer sleeves to reduce heat transfer by conductance.

As shown best in FIG. 3, a plurality of interconnected internal channels 31 are formed between adjacent turns of the stranded wire. The tungsten strands, which have a higher melting point than the titanium strands, form a supporting core for the titanium when it is melted. A major portion of the titanium is disposed in the core interior so it must contract a plurality of surfaces after melting or evaporating before it can escape from the core surface.

The heat shield cup 24 is supported by a pair of outwardly extending spring arms 32 attached at their inner ends to diametrically opposed locations on the outer sleeve, and at their respective outer ends to insulators 34 mounted on a lower ring 36 attached to three (only two of which are shown) equiangularly spaced vertical strips 37 secured by screws 38 at their lower ends to the interior of the pump housing.

An electrical lead 40 is connected at its lower end to one of the insulators 34 and at its upper end to an insulator 42 mounted on an upper ring 44 secured to the upper ends of the strips 36. A spring contact 46 is connected to the electrical lead 40 at the insulator 42 and makes electrical contact with the lower end of a first terminal 48 sealed by insulating bushing 50 through the top of the pump. The terminal 48 is connected through a first current limiter 51 to the positive side of a first D.C. voltage source 52 having its negative terminal grounded.

A hollow cylindrical grid 54 having an upper circular wire brace 56 connected by laterally spaced vertical wires 58 to a lower circular wire brace 60 is mounted above the evaporator and connected by a heavy supporting wire 62 to an insulating bushing 63 on the upper ring. The wire 62 is connected at the insulating bushing 63 to a spring contact 64 which bears against the lower end of a second terminal 66 sealed by an insulating bushing 68 through the top of the pump. The terminal 66 is connected through a second current limiter 69 to the positive side of a second D.C. voltage source 70 having its negative terminal grounded.

A thermionic grid filament 71 is disposed between the evaporator and the lower end of the grid and is connected by suitable leads 72 and insulating bushings (not shown) through the top of the pump in a circuit as shown schematically in FIG. 4.

An elongated vertical heater filament 74 is coaxially disposed through the evaporator, and connected through suitable leads 75 and insulating bushings (not shown) in the top of the pump in a circuit as shown schematically in FIG. 4.

Referring to FIG. 4, the grid 54 is connected through the second current limiter 69 to the positive terminal on the second D.C. source 70, the negative terminal of which is grounded. A double throw, double pole switch 55 is employed to connect the evaporator 10 to a positive voltage source and the heater filament 74 to ground in one position and to connect the evaporator to ground and the filament 74 to a negative potential in another position as will be more fully described. The switch 55 includes moving contacts 55A and 55B and stationary contacts 55C, 55D, 55E and 55F. With the moving contacts 55A and 55B connected to the stationary contacts 55C and 55E the evaporator 10 is connected through the first current limiter 51 to the positive terminal of the first D.C. source 52, the negative terminal of which is grounded. The heater filament 74 is grounded when the movable contact 55B is engaged with the stationary contact 55E. The pump housing 12 is also connected to ground as shown. The heater filament 74 is supplied heating current from a first transformer 76. The grid filament 71 receives heating current from a second transformer 78, and is connected to the positive terminal of a third D.C. voltage source 79, which has its negative terminal grounded. The voltage of the third source may vary from a few volts to a few hundred volts, depending on the geometry of the pump components. The purpose of the third source is to avoid capture of electrons from the grid filament by surfaces at ground potential.

In some instances, the pump is easier to start with the evaporator 10 grounded and a negative voltage impressed on the heater filament 74. This may be done by changing the position of the switch 55 so that the movable contacts 55A and 55B engage the stationary contacts 55D and 55F, respectively.

With the pump shown in FIGS. 1 through 4, the system is started most easily by placing a furnace 57 around the pump housing 12 and outgassing the pump at about 300° C. while a roughing pump 59 is operated and connected through a valve 65 to the lower end of the pump housing as shown in FIG. 11. The furnace 57 includes two heating elements 57A and 57B which are connected to a source of energizing potential 57C. The conduit 67 as shown in FIG. 11 is suitably coupled to the lower end of the pump housing 12 for connection to the chamber to be evacuated by the pump. Evaporator power is turned on during the latter stages of the bake out. The electrons from the heater filament bombard the cartridge in the evaporator, raising the temperature sufficiently to cause the titanium to melt and evaporate. On the initial heating, the titanium gives up large quantities of extraneous gas which promptly diffuse through the interconnected internal channels of the evaporator core and escape from the core surface. The melted titanium flows over the surfaces of the tungsten strands, and apparently is evaporated, condensed, and re-evaporated many times before escaping from the core. This provides for a thorough outgassing and purification of the titanium before it finally escapes from the cartridge in a finely atomized state. When a pressure of about $10^{-3}$ mm. of Hg is obtained, the furnace is removed and the roughing pump cut off from the system by closing the aforementioned valve. The grid and its filament are raised to the proper voltages, such as those indicated in FIGS. 1 and 4. The electrons from the grid filament are directed into the space enclosed by the grid 54, where some of them collide with gas molecules to produce ionization or dissociation of the gas molecules to be pumped.

The mechanism involved in the removal of gas by the evaporation of a gettering material such as titanium is discussed in detail in my U.S. Patent 2,850,225, as are the various details for optimum pump geometry starting procedure, etc. Briefly, however, the pumping mechanism involved in the removal of gas by the gettering material depends upon the type of getter evaporated and the kinds of gases present in the pumping system. Chemical combination, adsorption, absorption, gas-metal solutions, and solutions of compounds of the gas in the gettering material are possible means of initially trapping gas which is subsequently buried under new material condensing on the interior surface of the pump housing. Since the attraction between the gas molecules and a freshly condensed active surface of the getter is usually insufficient to trap all types of gas molecules until they are securely buried by new getter material, the gas molecules are preferably ionized or dissociated by electron bombardment inside the grid. To improve the trapping action further, the relatively high electric field maintained between the grid and the interior surface of the pump housing drives the gaseous ions into the active surface sufficiently deep to prevent escape before burial by new getter condensing on the surface.

Any one of a number of materials or alloys may serve as the gettering material in the evaporator of this invention. Titanium, zirconium, uranium and other metals particularly in groups IV and V of the periodic table, for example, can be employed. Aluminum, alkaline earth metals, and the alkali metals are other materials which can be used in the evaporator of this invention. Titanium is a preferred gettering material because it provides a good active surface and forms stable solids with very low vapor pressures.

The core material need not be wire, and can be almost any material which is inert and has a higher melting point than the material to be evaporated. Metals such as molybdenum and alloys such as tantaloy can be used in addition to tungsten with gettering material such as titanium.

A fundamental requirement of the evaporator is that the core and evaporable material be intermeshed in a compact array. Such an arrangement has a minimum amount of heat loss by radiation and makes it possible to have a relatively large amount of evaporable material at a temperature adequate for evaporation without great power consumption, and thus the evaporable material lasts a long time.

Another form of the evaporator is shown in FIG. 5, in which the standard wire is tightly wound to form a solid cylinder or cartridge 90 which is connected to the positive terminal of a D.C. voltage source 92 having the negative terminal grounded. A thermionic heater filament 94 surrounds and is spaced from the cartridge 90. Heating current is supplied to the grounded filament through a transformer 96. The use of the evaporator shown in FIG. 5 is similar to that described with respect to the apparatus shown in FIGS. 1 through 4.

Another evaporator is shown in FIG. 6, and includes stranded wire wound to form a solid cylindrical cartridge 97 mounted in a compactly wound wire filament 98 spaced slightly from the cartridge. The cartridge and filament are surrounded by a heat shield 99 which is similar to that shown in FIG. 1, except that the heat shield 99 includes a bottom 100 made up of three layers 102 each spaced from the other to decrease heat loss by conductance. The filament 98 is supplied heating power from a transformer 104. With the arrangement in FIG. 6, heating of the cartridge is by radiation.

The evaporator shown in FIG. 7 includes a compact cylindrical cartridge 106 wound from stranded wire as previously described, and having a central bore 108. The cartridge is disposed in a heat shield cup 110 which is closed at its bottom. A "hairpin" thermionic heater filament 111 is disposed inside the cylindrical cartridge and supplied power from a transformer 112. A battery 113 is connected to the filament and cartridge through the heat shield cup to make the cartridge positive with respect to the filament and thus aid the heating of the cartridge by electron bombardment.

With the evaporator shown in FIG. 7, as with that shown in FIG. 6, the escape of the evaporated material is limited to the open end of the heat shield and, thus, the evaporated material is confined to a more localized area. This is an advantage when the evaporator is located as shown in FIG. 1 below the grid and it is preferable to have as much evaporated material as possible directed into the grid area where it is most effective in pumping.

The evaporator shown in FIG. 8 includes a compact cylindrical cartridge 120 wound from stranded wire as previously described. The cartridge is disposed in an inverted heat shield cup 122 so that the cup is closed at its top and open at its bottom. The cartridge makes a snug fit in the cup, and is held in place by inwardly extending projections 123 formed on the interior of the cup. A circular wire heater filament 124 is disposed below the evaporator and spaced slightly from it. The filament is supplied power from a transformer 126 and is biased negative with respect to the evaporator by battery 128.

With the evaporator shown in FIG. 8, as with those shown in FIGS. 6 and 7, the escape of the evaporated material is limited to the open end of the heat shield. The filament is disposed outside the evaporator, and the exposed end of the cylindrical cartridge is heated by electron bombardment. An advantage of the evaporator shown in FIG. 8 is that for a given amount of stored evaporable material, the radiating area is somewhat less than in other forms, thereby permitting storage of a larger supply of evaporable material, and better control on rate of evaporation. Moreover, filament emission is easier to control, making it more feasible to operate with the filament emission space-charge limited, and permitting the elimination of power control devices for filament current.

The evaporator shown in FIG. 9 is identical to that of FIG. 8, except that a compact cylindrical cartridge 130 wound from stranded wire as previously described, includes a small conical opening 132 in its lower end, which is sometimes helpful in control of evaporation rates.

The evaporator shown in FIG. 10 includes a compact cylindrical cartridge 134 wound from stranded wire as previously described and disposed in an upright heat shield cup 136 open at its top. A circular wire filament 138 is disposed above the upper end of the cartridge and supplied heating power from a transformer 140. The filament is biased negative with respect to the cartridge by battery 142. The evaporator shown in FIG. 10 is similar to that of the previously described evaporators, in that the cartridge is heated by electron bombardment from the filament. However, the evaporator of FIG. 10 includes a guide sleeve 144 disposed above the filament and connected to a feeding mechanism 145, which may be of conventional type, such as is disclosed in my U.S. Patent 2,850,225. A wire 146 of the material to be evaporated is wrapped on a rotatable supply spool 147 on the feeding mechanism. The wire 146 is disposed in the guide sleeve and adapted to be pushed by the feeding mechanism through the central portion of the filament 138 toward the top surface of the cartridge. Thus, when the supply of evaporable material in the cartridge runs low, the wire of fresh material to be evaporated is advanced toward the cartridge so that the fresh evaporable material is melted and flows down into the interconnected channels of the cartridge. Thus, with the evaporator of FIG. 10 a pump or evaporator need not be cooled and open to atmospheric pressure to permit the replacement of a cartridge. Instead, the cartridge is recharged while the pump or evaporator is maintained at or near operating conditions.

Although it is ordinarily desirable to use heat shields to minimize power required in operating the evaporator, the shields can be omitted in some arrangements in which the consequent heat loss is permissible.

Operating pumps with the evaporators built in accordance with this invention has produced higher pumping speeds, especially in the low pressure range, say below $10^{-6}$ mm. Hg. Moreover, the gettering material is supplied without using complex mechanical feeders requiring moving parts. The evaporator of this invention also permits a more accurate control of the evaporation rate of the evaporable material, and the rate of evaporation is more uniform, as is the distribution of the evaporated material. In addition, the evaporated material seems to be purer and more nearly atomic, resulting in better gettering action. A final but important advantage is that there is a better pre-degassing of all of the material to be evaporated when it is initially heated, so that subsequent evaporation of the material is virtually free of extraneous gas. All of the foregoing advantages apply to evaporative coating as well as pumping by gettering action.

I claim:

1. An evaporator comprising a supporting core having a plurality of interconnected internal channels opening out of the core surface, a material to be evaporated disposed in the channels so that a major portion of the material is disposed in the core interior, the material to be evaporated having lower melting and evaporating temperatures than the material of the core, and means for heating the evaporator to cause the material to be evaporated to melt and flow on the core material and to cause the vaporized material to contact a plurality of surfaces prior to escape from the core.

2. An evaporator comprising a supporting core having an opening in its central portion and a plurality of interconnected internal channels opening out of the core surface, a material to be evaporated disposed in the channels so that a major portion of the material is disposed in the core interior, the material to be evaporated having a lower melting and evaporating temperature than the material of the core, and means for heating the evaporator to cause the material to be evaporated to melt and flow on the core material and to cause the vaporized material to contact a plurality of surfaces prior to escape from the core.

3. Apparatus according to claim 2 wherein the heating means is disposed in the opening in the core.

4. Apparatus according to claim 3 in which the heating means is spaced from the core.

5. An evaporator comprising a supporting core having a plurality of interconnected internal channels opening out of the core surface, a material to be evaporated disposed in the channels so that a major portion of the material is disposed in the core interior, the material to be evaporated having a lower melting and evaporating temperature than the material of the core, a heater spaced from the core to heat the core and cause the material to be evaporated to melt and flow on the core material and to cause the vaporized material to contact a plurality of surfaces prior to escape from the core, and means for making the core electrically positive with respect to the heater.

6. An evaporator comprising a supporting core having a plurality of interconnected internal channels opening out of the core surface, titanium disposed in the channels so that a major portion of the titanium is disposed in the core interior, the titanium having lower melting and evaporating temperatures than the core, and means for heating the titanium to cause it to melt, flow on the core material, evaporate and contact a plurality of surfaces prior to escape from the core.

7. An evaporator comprising a stranded material looped around itself to form between adjacent loops a plurality of interconnected internal channels opening out of the surface of the looped stranded material, at least one strand being composed of a material to be evaporated and at least one other strand being composed of a material having a higher melting point than the material to be evaporated, and means for heating the stranded material to vaporize the material to be evaporated.

8. Apparatus according to claim 7 in which the material to be evaporated is titanium.

9. An evaporator comprising a supporting core having a plurality of interconnected internal channels opening out of the core surface, a material to be evaporated disposed in the channels so that a major portion of the material is disposed in the core interior, the material to be evaporated having a lower melting and evaporating temperature than the material of the core, means for heating the evaporator to cause the material to be evaporated to melt and flow on the core material and to cause the vaporized material to contact a plurality of surfaces prior to escape from the core and a heat shield disposed around and spaced from the core.

10. An evaporator comprising a supporting core having a plurality of interconnected internal channels opening out of the core surface, a material to be evaporated disposed in the channels so that a major portion of the material is disposed in the core interior, the material to be evaporated having a lower melting and evaporating temperature than the material of the core, means for heating the evaporator to cause the material to be evaporated to melt and flow on the core material and to cause the vaporized material to contact a plurality of surfaces prior to escape from the core and a plurality of concentric sleeves spaced from each other and disposed around and spaced from the core.

11. An evaporator comprising a supporting core having a plurality of interconnected internal channels opening out of the core surface, a material to be evaporated disposed in the channels so that a major portion of the material is disposed in the core interior whereby material heated in the core contacts a plurality of surfaces prior to escape from the core, the material to be evaporated having lower melting and evaporating temperatures than the material of the core, heat shield means disposed around the core, and heating means disposed below and adjacent the core, the core in the vicinity of the heating means being uncovered by the heat shield means.

12. An evaporator comprising a supporting core having an opening in its central portion and a plurality of interconnected internal channels opening out of the core surface, a material to be evaporated disposed in the channels so that a major portion of the material is disposed in the core interior whereby material heated in the core contacts a plurality of surfaces prior to escape from the core, the material to be evaporated having lower melting and evaporating temperatures than the material of the core and heating means disposed below the evaporator adjacent the opening.

13. An evaporator comprising a supporting core having a plurality of interconnected internal channels opening out of the core surface, a material to be evaporated disposed in the channels so that a major portion of the material is disposed in the core interior whereby material heated in the core contacts a plurality of surfaces prior to escape from the core, the material to be evaporated having lower melting and evaporating temperatures than the material of the core, means for heating the core, a supply of fresh material to be evaporated spaced from the core, and means for feeding fresh material toward the core so the material is melted and flows in the interconnected channels of the core.

14. An evaporator comprising a supporting core having a plurality of interconnected internal channels opening out of the core surface, a material to be evaporated disposed in the channels so that a major portion of the material is disposed in the core interior, the core and the material to be evaporated being arranged so that the core and the material to be evaporated are intermeshed in a compact array, the material to be evaporated having a lower melting and evaporating temperature than the material of the core, and means for heating the evaporator to cause the material to be evaporated to melt and flow on the core material and to cause the evaporated material to contact a plurality of surfaces prior to escape from the core.

15. The combination as defined in claim 14 wherein the supporting core is formed by a plurality of strands of the core material, the material to be evaporated is formed by a plurality of strands of the material to be evaporated, the strands of the core material being interwound with the strands of the material to be evaporated and the strands of the core material being of less diameter than the strands of the material to be evaporated.

16. An evaporator comprising a supporting core and a material to be evaporated stranded together to provide a plurality of interconnected internal channels opening out of the surface of the stranded material, a major portion of the material to be evaporated being disposed in the interior of the stranded material, the material to be evaporated having a lower melting and evaporating temperature than the material of the core, and means for heating the evaporator to cause the material to be evaporated to melt and flow on the core material and to cause the evaporated material to contact a plurality of surfaces prior to escape from the core.

References Cited in the file of this patent

UNITED STATES PATENTS

| 1,557,092 | Rodman | Oct. 13, 1925 |
| 2,074,281 | Sommer | Mar. 16, 1937 |
| 2,100,045 | Alexander | Nov. 23, 1937 |
| 2,103,623 | Kott | Dec. 28, 1937 |

(Other references on following page)

UNITED STATES PATENTS

| | | |
|---|---|---|
| 2,153,786 | Alexander et al. | Apr. 11, 1939 |
| 2,430,994 | Reynolds | Nov. 18, 1947 |
| 2,447,789 | Barr | Aug. 24, 1948 |
| 2,469,626 | Beers | May 10, 1949 |
| 2,479,541 | Osterberg | Aug. 16, 1949 |
| 2,486,436 | Rothstein | Nov. 1, 1949 |
| 2,527,747 | Lewis et al. | Oct. 31, 1950 |
| 2,693,521 | Alexander | Nov. 2, 1954 |
| 2,757,788 | Weber | Aug. 7, 1956 |
| 2,794,932 | Lemaigre-Voreaux | June 4, 1957 |
| 2,804,563 | Palmer | Aug. 27, 1957 |
| 2,812,411 | Moles | Nov. 5, 1957 |
| 2,837,680 | Leferson | June 3, 1958 |
| 2,866,065 | Hirsh | Dec. 23, 1958 |
| 2,899,528 | Reichelf | Aug. 11, 1959 |
| 2,902,574 | Gudmundsen et al. | Sept. 1, 1959 |
| 2,914,643 | Fields et al. | Nov. 24, 1959 |
| 2,960,618 | Waer | Nov. 15, 1960 |

FOREIGN PATENTS

| | | |
|---|---|---|
| 722,866 | Great Britain | Feb. 2, 1955 |
| 953,677 | Germany | Dec. 6, 1956 |

OTHER REFERENCES

Holland: "Vacuum Deposition of Thin Films," 1956 article "Multi-Strand Filaments," page 117.

UNITED STATES PATENT OFFICE
CERTIFICATE OF CORRECTION

Patent No. 3,117,210                                  January 7, 1964

Raymond G. Herb

It is hereby certified that error appears in the above numbered patent requiring correction and that the said Letters Patent should read as corrected below.

Column 1, lines 58 and 59, strike out "to be evaporated to melt and flow over the core material"; column 2, line 36, for "the", first occurrence, read -- use --; column 3, line 1, for "contract" read -- contact --; column 4, line 26, for "espacing" read -- escaping --; column 5, line 12, for "standard" read -- stranded --.

Signed and sealed this 23rd day of June 1964.

(SEAL)
Attest:

ERNEST W. SWIDER                                  EDWARD J. BRENNER
Attesting Officer                                    Commissioner of Patents